(12) United States Patent
Banerjee

(10) Patent No.: US 9,574,686 B2
(45) Date of Patent: Feb. 21, 2017

(54) INVISIBLE SEAM LAMINATED ARTICLE AND PROCESS OF MANUFACTURE

(75) Inventor: Mrinal Kanti Banerjee, Mumbai (IN)

(73) Assignee: Essel Propack Ltd., Mumbai (IN)

( * ) Notice: Subject to any disclaimer, the term of this patent is extended or adjusted under 35 U.S.C. 154(b) by 396 days.

(21) Appl. No.: 14/117,789

(22) PCT Filed: Jun. 4, 2012

(86) PCT No.: PCT/IN2012/000391
§ 371 (c)(1),
(2), (4) Date: Dec. 6, 2013

(87) PCT Pub. No.: WO2013/051008
PCT Pub. Date: Apr. 11, 2013

(65) Prior Publication Data
US 2014/0251487 A1    Sep. 11, 2014

(30) Foreign Application Priority Data

Jun. 6, 2011 (IN) .......................... 1649/MUM/2011

(51) Int. Cl.
| | | |
|---|---|---|
| *F16L 9/00* | (2006.01) |
| *F16L 9/22* | (2006.01) |
| *F16L 9/12* | (2006.01) |
| *B32B 7/02* | (2006.01) |
| *B32B 27/08* | (2006.01) |
| *B32B 27/30* | (2006.01) |
| *B32B 27/32* | (2006.01) |
| *B32B 1/08* | (2006.01) |
| *B32B 3/02* | (2006.01) |
| *B65D 35/02* | (2006.01) |

(52) U.S. Cl.
CPC . *F16L 9/12* (2013.01); *B32B 1/08* (2013.01); *B32B 3/02* (2013.01); *B32B 7/02* (2013.01); *B32B 27/08* (2013.01); *B32B 27/306* (2013.01); *B32B 27/32* (2013.01); *B32B 2307/30* (2013.01); *B32B 2307/75* (2013.01); *B32B 2439/00* (2013.01); *B32B 2597/00* (2013.01); *B65D 35/02* (2013.01)

(58) Field of Classification Search
CPC ................ F16L 9/12; B32B 1/08; B32B 7/02; B32B 27/08
USPC .................................. 138/120, 155
See application file for complete search history.

(56) References Cited

U.S. PATENT DOCUMENTS

| | | | | |
|---|---|---|---|---|
| 4,178,401 A | * | 12/1979 | Weinberg ................ | B32B 27/32 138/137 |
| 4,282,905 A | | 8/1981 | Dopkin et al. | |
| 4,539,259 A | * | 9/1985 | Zuscik .................... | B32B 15/08 222/107 |
| 4,733,800 A | * | 3/1988 | Bjorkengren ......... | B29C 53/382 138/138 |
| 4,948,643 A | * | 8/1990 | Mueller ................ | A61L 29/085 138/137 |
| 5,913,449 A | * | 6/1999 | Branch .................. | B65D 35/12 220/677 |

(Continued)

*Primary Examiner* — Paul R Durand
*Assistant Examiner* — Vishal Pancholi
(74) *Attorney, Agent, or Firm* — Baker & Hostetler LLP

(57) ABSTRACT

The present disclosure relates to a laminated article with an invisible seam. The laminated article, in accordance with the present disclosure, is a laminate tube or lamitube. The present disclosure also relates to a process for manufacturing of laminated articles with substantially invisible seam.

8 Claims, 2 Drawing Sheets

(56) References Cited

U.S. PATENT DOCUMENTS

| | | | |
|---|---|---|---|
| 6,110,600 A * | 8/2000 | Ramesh | A22C 13/0013 138/118.1 |
| 2001/0042297 A1 | 11/2001 | Wolf et al. | |
| 2009/0092792 A1* | 4/2009 | Thomasset | B29C 65/5021 428/157 |
| 2010/0243094 A1* | 9/2010 | Arz | B32B 1/08 138/103 |

* cited by examiner

INVISIBLE SEAM LAMINATED ARTICLE AND PROCESS OF MANUFACTURE

TECHNICAL FIELD

The present disclosure relates to a laminated article with an invisible seam or a substantially invisible seam, and process of preparation the same. The present disclosure, in particular, relates to invisible seam lamitubes and process of preparation.

BACKGROUND

Tubes are used in large quantities for the packaging and dispensing of various products, such as cosmetics, ointments, shampoo, toothpaste, ketchup, and the like. Initially, such tubes were made of light metals like aluminum however, due to certain drawbacks such as deformation, sharp edges, low shelf life, and less durability, plastic or laminated tubes, generally known as Plastic Barrier Laminated Tubes (PBL) Tubes have been introduced. Plastic Barrier Laminated (PBL) tubes are produced commercially and are now being widely used for wide range of product storage. For long term and efficient storage of products, the tubes are manufactured with multiple layers of films and different types of core barrier materials.

U.S. Pat. No. 4,282,905 discloses the production of seamless reinforced polymeric thermoplastic tubing for use with corrosive chemicals either alone or as a fixed lining for more rigid tubing. US Patent Application No. 2001/0042297 A1 discloses a method for producing a laminated tube of metal which has a pipe-like core sheathed in an external seamless tube, the core and external tube being telescoped together and then pressed together radially by drawing, as well as a method for producing a laminated tube of metal which is pressed radially by drawing.

During the process of manufacturing the laminate tubes, the laminate is slit according to the size of the laminated tube to be manufactured. Once the laminate is slit into smaller laminates of appropriate size, the outer layer of the laminates are printed. Further, the printed laminate is formed into a laminated tube by fusing together the longitudinal ends of the laminate. The longitudinal ends of the laminate are generally non-printed area or non-printed strips of the laminate that are overlapped and fused to form a seam of the tube. The seam of the tube is typically a hump shaped, high risen and distinguishably visible non-printed area. The seam is generally left non-printed because chemicals such as varnish contained in printing ink usually contaminate the seam area causing superficial bond between the seal interfaces during the process of fusing the laminates. As a result, the non-printed strips of the laminate restrict the area of printing on the laminate, thereby restricting a printed curved surface area of the laminated tube, and compromising with the aesthetics of the tube.

SUMMARY

The present disclosure relates to a laminated article with an invisible seam, or a substantially invisible seam. The laminated article, in accordance with the present disclosure, is a laminated tube or lamitube.

In an aspect of the present disclosure, it provides a laminated article with an invisible seam, comprising: a multilayer laminate wherein the inner layer of said laminate is of a material with lower melting point and higher melt flow index than the material in the outer layer of the laminate; said laminated article is formed by fusing the inner layer of said multilayer laminate along longitudinal ends of the laminate by heating at a high pressure to form a butt joint, and the outer layer of the laminate are not used in fusing, wherein said laminated article is with an invisible seam or a substantially invisible seam.

The present disclosure also relates to a process for manufacturing of laminated articles with substantially invisible seam.

These and other features, aspects, and advantages of the present subject matter will become better understood with reference to the following description. This statement is provided to introduce a selection of concepts in a simplified form. This statement is not intended to identify key features or essential features of the subject matter, nor is it intended to be used to limit the scope of the subject matter.

BRIEF DESCRIPTION OF DRAWINGS

The above and other features, aspects, and advantages of the subject matter will be better understood with regard to the following description, appended claims, and accompanying drawings where:

DETAILED DESCRIPTION

Figure 1:
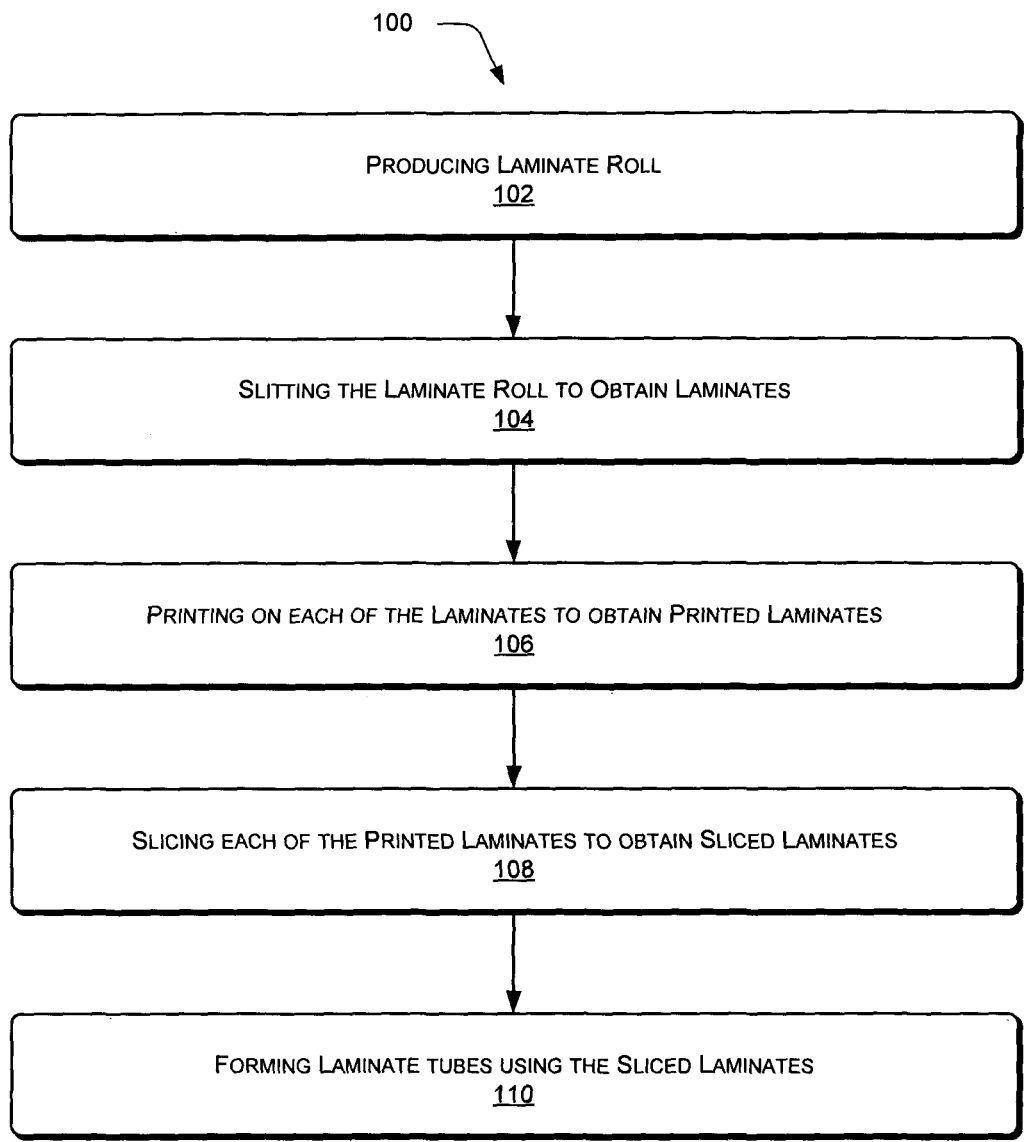
FIG. 1 illustrates a laminated tube production process for producing a laminated tube with substantially invisible seam, according to an embodiment of the present subject matter.

The present disclosure provides a laminated article with an invisible seam, or a substantially invisible seam. The laminate article, in accordance with the present disclosure, is a laminate tube or a lamitube.

In one aspect, an embodiment of the present disclosure provides the laminated article with an invisible seam, comprising: a multilayer laminate wherein the inner layer of said laminate is of a material with lower melting point and higher melt flow index than the material in the outer layer of the laminate; said laminated article is formed by fusing the inner layer of said multilayer laminate along longitudinal ends of the laminate by heating at a high pressure to form a butt joint, and the outer layer of the laminate are not used in fusing, wherein said laminated article is with an invisible seam or a substantially invisible seam.

By the term "substantially invisible seam" in accordance with the present disclosure refers to a thin, not distinguishably visible seam.

In an embodiment, the outer layer of the multilayer laminate, that forms the laminated article, forms a continuous surface without any joint over the surface area of the laminated article.

In one embodiment longitudinal ends of the laminate are joined by fusing inner layers of the longitudinal ends thus forming butt joints and allowing the outer layer of the longitudinal ends to contact each other without joining. Fusing the longitudinal ends of the inner layer of the laminate to form butt joints involves heating the longitudinal ends under high pressure conditions. The longitudinal ends of the laminate then flow over each other such that the non-fused outer layers of the longitudinal ends form a continuous surface thus forming a substantially invisible seam, also referred to as an invisible seam. Fusing the longitudinal ends using such a process allows printing on the outer layers of the longitudinal ends as the outer layers of the longitudinal ends are not used in fusing and allows continuous surface over the surface area of the laminated article. Thus, the method of manufacturing laminated tubes with the invisible seam facilitates in achieving 360° printing effect over the curved surface of the laminated tube.

Laminates used for manufacturing the laminated tubes are typically made of various layers of extruded plastic films bonded together either by fusing or by using an adhesive. Generally, the laminates are formed as multiple layers namely an outer layer, one or more middle layer, and an inner layer. The outer layer usually serves as the printing layer and is composed mainly of polyethylene. The middle layers of the laminate are usually formed of ethyl vinyl alcohol (EVOH) and serve as barrier layers to atmospheric air and moisture. The inner layer of the laminate is mainly composed of polyethylene and serves as a sealant layer. Conventional laminates have a thickness ranging from about 300 microns (μm) to 500 microns (μm).

The laminates are generally produced by binding and fusing the above mentioned layer together. Big rolls of laminate are then slit according to the size of the laminated tube to be manufactured. Once the big rolls of laminate are slit into smaller laminates of appropriate size, the outer layer of the laminates is generally pre-treated, for example, by corona treatment. The pre-treatment is provided to prepare the outer layer for better adherence of inks used for printing on the outer layer. The pre-treated laminates are then printed using art works and details provided by customers.

Typically, while performing such printing, a non-printed area or a non-printed strip is left over the outer layer of the laminate and along longitudinal ends of the laminate. The longitudinal ends of the laminate are then fused by hermetically sealing the non printed strips together to form laminated tubes. The longitudinal ends of the laminate are generally overlapped and fused together to form a hump shaped non-printed area called a seam of the tube. The seam is generally left non-printed as chemicals such as varnish contained in printing ink may weaken the seam during the process of fusing the laminates. As a result, the non-printed strips of the laminate restrict the area of printing in the laminate, thereby restricting a printed curved surface area of the laminated tube, and compromising with the aesthetics of the tube.

In accordance with the present disclosure, the polymers used for making laminates are selected such that polymers used for making the inner layers have more fluidity, or less melting point or high melt flow index than the polymers used for making the outer and the middle layers. In an embodiment, the inner layer of multilayer laminate has a melt flow index the range of 3.0 g/10 min/2.16 kg to 7.0 g/10 min/2.16 kg. Using polymers having higher melt flow properties facilitates in forming the butt joints as the polymers flow easily and faster over each other after melting, thus forming the invisible seam. Using polymers having good melt flow properties facilitates in forming the butt joints as the polymers flow easily and faster over each other after melting, thus forming the invisible seam.

In another embodiment, the outer layer of the multilayer laminate is polyethylene layer. In still another embodiment, the middle layer of the multilayer laminate is ethyl vinyl alcohol layer. In yet another embodiment, the inner layer of the multilayer laminate is polyethylene layer.

In still another embodiment, laminated article with an invisible seam is a tube or a lamitube.

Further an embodiment, laminated article with an invisible seam is printed all over the surface area.

The present disclosure further provides a process for preparation of a laminated tube with an invisible seam, said process comprising: providing a multilayer laminate with the inner layer of a material with lower melting point and higher melt flow index than the material in the outer layer of the laminate; joining longitudinal ends of a multilayer laminate by fusing the inner layer of the laminate under high pressure to obtain butt joint; allowing the outer layer of the multilayer laminate to contact each other without joining the said layers to obtain a continuous surface; and allowing the longitudinal ends of the sliced laminate to flow over each other such that the non-fused outer layers of the longitudinal ends form a continuous surface resulting in an invisible seam on a laminate tube to obtain a laminated tube with an invisible seam.

In an embodiment, the said longitudinal ends of the multilayer laminate are at predetermined angles, θ1 and θ2, respectively wherein the edges at the predetermined angles θ1 and θ2 facilitates in better joining of the longitudinal ends while forming the butt joints.

In an embodiment, FIG. 1 illustrates a laminated tube production process 100. The process 100 is for producing a laminated tube with a substantially invisible seam, according to said embodiment of the present subject matter.

In an embodiment, the laminate production process 100 includes a laminate roll production step 102, a slitting step 104, a printing step 106, a laminate slicing step 108, and a tubing step 110. In the roll production step 102 big rolls of laminates which are to be used for manufacturing the laminated tubes are formed. The big rolls of laminates are then sliced in step 104. The laminates are typically made of multiple layers, namely an outer layer, one or more middle layer, and an inner layer of extruded plastic films bonded together. The outer layer usually serves as the printing layer and is composed mainly of polyethylene. The middle layers of the laminate are usually formed of ethyl vinyl alcohol (EVOH) and serve as barrier layers to atmospheric air and moisture. The inner layer of the laminate is mainly composed of polyethylene and serves as a sealant layer.

Production of the big rolls of laminates is then followed by the slitting step 104. In one implementation, the big rolls of laminates produced at the laminate roll production step 102 are initially cured at room temperature for 72 hours. Once the curing process is completed, the big rolls of laminates are slit at the slitting step 104. The big rolls of laminates are unwound and slit into laminates of various sizes based on the size of the laminated tube to be manufactured. Examples of the slitting process 104 include, but are not limited to, slitting by speed rotary slitters.

The slitting step 104 is then followed by the printing step 106. In one implementation, the printing step 106 is performed using a variety of printing plates prepared for each color required for printing designs on the laminates. The designs used for printing on the laminates are generally art works and details provided by customers. In one implementation, the designs are printed on the whole laminate unlike the conventional system, where a non-printed area is usually left along longitudinal ends of the outer layer of the laminate.

The fully printed laminates are then sliced at the laminate slicing step 108.

In one embodiment, the laminate slicing step 108 comprises slicing edges of the laminates along the longitudinal ends at predetermined angles. For instance, the laminate may be sliced in the form of chisel cuts at the predetermined angles. The chisel cuts are provided along both the longitudinal ends to achieve a line-to-line cut such that edges of the longitudinal ends can be matched with each other along the line-to-line cut. Further, the laminates are sliced such that the angle at which one longitudinal end is sliced is supplementary to the angle at which the other longitudinal end is sliced. Slicing the longitudinal ends at supplementary angles facilitates in reducing thickness of the joint formed by fusing the laminates to form the laminated tubes. Reducing the thickness of the joint further helps in achieving the is substantially invisible seam, also referred to as invisible seam. Sliced laminates with the chisel cut are further explained with reference to FIGS. 2a and 2b.

The sliced laminates are then formed into the laminated tubes at the tubing step 110. In the tubing step 110, the longitudinal ends of the sliced laminates are fused to form the laminated tube with the invisible seam.

In one embodiment, the tubing step 110 comprises tubing by a guide roller (not shown in figure) and a belt (not shown in figure) for feeding the laminates. The guide roller and the belt feed the laminate such that longitudinal ends of the laminate are placed side to side for being fused together. Further, the longitudinal ends are placed along the line-to-line cut. On being placed side to side, the laminate is subjected to heat and pressure to melt the laminate. As described previously, the polymers used for making the laminates are selected such that the polymers used for making the inner layers have lower melting point and more fluidity than the polymers used for making the outer and the middle layers. Thus, being subjected to the heat and pressure, the inner layer along the longitudinal ends of the laminate melts before the middle layer and the outer layer and starts to flow.

The melted inner layer along one of the longitudinal ends then overlaps the inner layer along the other longitudinal end. The inner layers of the laminate are then fused to form a butt joint such that the outer layer of the longitudinal ends contact each other without joining. Accordingly, the non-fused outer layers of the longitudinal ends form a continuous surface. Fusing the laminates using the above process facilitates in forming the invisible seam. Thus the seam present on the outer layer of the laminated tube acts as only an apparent seam, as the middle and inner layers of the laminated tube contribute to the formation of actual seam. Fusing the longitudinal ends using such a process thus allows helps in improving the aesthetics of the tube as the seam now becomes invisible.

Further, using the above described process for making the laminated tubes also allows printing at the seam area of the laminated tube as the outer layer is not involved in the process of fusing the laminates, thus removing the chance of the seam being damaged by chemicals used in printing. Additionally, the method of manufacturing laminated tubes with the invisible seam facilitates in achieving 360° printing effect over the curved surface of the laminated tube.

Figure 2A:
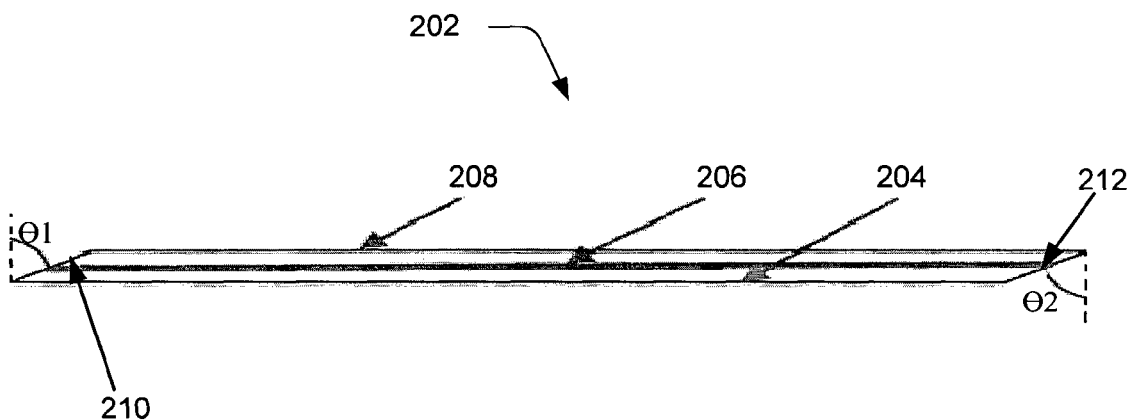
FIG. 2a illustrates the structure a laminate having a chisel cut at a predetermined angle used for manufacturing the laminated tube with substantially invisible seam, according to an embodiment of the present subject matter.

FIG. 2a illustrates the structure of a laminate 202 having a chisel cut at a predetermined angle used for manufacturing a laminated tube with a substantially invisible seam, according to an embodiment of the present subject matter. As previously described, the laminate 202 is made from three layers, an outer layer 204 that serves as the printing layer, a barrier layer 206 that serves as a barrier to atmospheric air and moisture, and a sealant layer 208, used as sealant. In one embodiment, a first edge 210 and a second edge 212 of the laminate 202 are sliced at predetermined angles $\theta 1$ and $\theta 2$, respectively. For instance, the first edge 210 and the second edge 212 may be sliced in the form of chisel cuts at the predetermined angles $\theta 1$ and $\theta 2$. As described earlier, the chisel cuts are provided along both the edges 210 and 212 to achieve a line-to-line cut such that the edges 210 and 212 can be matched with each other along the line-to-line cut. Further, to achieve the line-to-line cut, the predetermined angles $\theta 1$ and $\theta 2$ are always selected such that angles $\theta 1$ and $\theta 2$ form of a pair of supplementary angles. For example, the angles $\theta 1$ and $\theta 2$ may be 45 degree each or selected from any other pair of supplementary angles such as 20 to 80 degree. Slicing the edges 210 and 212 at the supplementary angles $\theta 1$ and $\theta 2$ facilitates in reducing thickness of the seam formed by fusing the laminate 202 to form the laminated tubes.

Figure 2B:
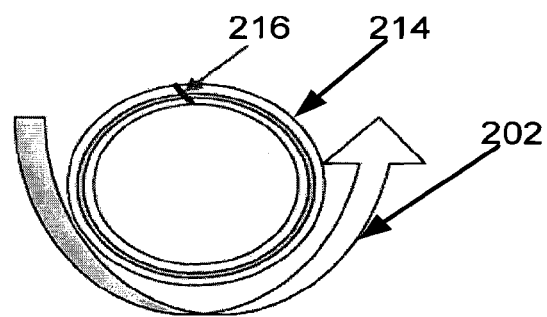
FIG. 2b illustrates cross-section of a laminated tube made from a laminate having a chisel cut at a predetermined angle, according to an embodiment of the present subject matter.

FIG. 2b illustrates cross-section of a laminated tube 214 made from the laminate 202 having the chisel cut at the predetermined angles $\theta 1$ and $\theta 2$, according to an embodiment of the present subject matter. In one embodiment, the laminate 202 having the chisel cuts is rolled such that the edges 210 and 212 are placed side by side along the line-to-line cut. The edges 210 and 212 of the laminate 202 are then fused under heat and pressure to form the laminated tube 214. Further, since the polymers used for making the laminate 202 are selected such that the polymers used for making the sealant layer 208 has lower melting point and more fluidity than the polymer used for making the outer layer 204 and the barrier layer 206. Thus, when being subjected to the heat and pressure, the sealant layer 208 along the edges 210 and 212 of the laminate 202 melts before the barrier layer 206 and the outer layer 208 and starts to flow, such that the edges 210 and 212 fuse to form a seam 216. Further, due to the chisel cut of the edges 210 and 212 and the supplementary angles $\theta 1$ and $\theta 2$, the seam 216 is very thin thus forming a substantially invisible seam. Additionally, using only the sealant layer 208 for fusing facilitates printing on the outer layer 204, thus allowing 360 degree printing on the laminate 202.

Although the subject matter has been described in considerable detail with reference to certain preferred embodiments thereof, other embodiments are possible. As such, the spirit and scope of the appended claims should not be limited to the description of the preferred embodiment contained therein.

I claim:

1. A laminated article with an invisible seam, comprising:
   a multilayer laminate comprised of an inner and outer layer wherein the inner layer of said laminate is of a material with lower melting point and higher melt flow index than the material in the outer layer of the laminate;
   said laminated article is formed by fusing the inner layer of said multilayer laminate along longitudinal ends of the laminate by heating at a high pressure to form a butt joint, and the outer layer of the laminate are not used in fusing, wherein said laminated article is with a substantially invisible seam and
   wherein the outer layer of the multilayer laminate forms a continuous surface without any joint over the surface area of the laminated article.

2. The laminated article with an invisible seam as claimed in claim 1, wherein the inner layer of multilayer laminate has a melt flow index in the range of 3.0 g/10 min/2.16 kg to 7.0 g/10 min/2.16 kg.

3. The laminate article with an invisible seam as claimed in claim 1, wherein the outer layer of the multilayer laminate is polyethylene layer.

4. The laminate tube with an invisible seam as claimed in claim 1, wherein the inner layer of the multilayer laminate is polyethylene layer.

5. The laminated article with an invisible seam as claimed in claim 1 wherein said article is a tube.

6. The laminated article with an invisible seam as claimed claim 1, wherein said article is printed all over the surface area.

7. A process for preparation of a laminated tube with an invisible seam, said process comprising:
   providing a multilayer laminate with an inner layer of a material and an outer layer of material wherein the inner layer of material having a lower melting point and higher melt flow index than the outer layer of material of the laminate;
   joining longitudinal ends of a multilayer laminate by fusing the inner layer of the laminate under high pressure to obtain butt joint;
   allowing the outer layer of the multilayer laminate to contact each other without joining the said layers to obtain a continuous surface; and
   allowing the longitudinal ends of the sliced laminate to flow over each other such that the non-fused outer layers of the longitudinal ends form a continuous surface resulting in an invisible seam on a laminate tube to obtain a laminated tube with an invisible seam without any joint over the surface area of the laminated tube.

8. The process as claimed in claim 7 wherein said longitudinal ends of the multilayer laminate are at predetermined angles.

\* \* \* \* \*